United States Patent
Zaifman et al.

(10) Patent No.: US 9,720,715 B2
(45) Date of Patent: Aug. 1, 2017

(54) EXTENDING LEGACY SCRIPTING LANGUAGES WITH GRAPHICAL REFERENCES

(75) Inventors: Arthur Zaifman, Millburn, NJ (US); John Ellson, Eatontown, NJ (US); Paul Ireifej, Parsippany, NJ (US); John Mocenigo, Califon, NJ (US)

(73) Assignee: Nuance Communications, Inc., Burlington, MA (US)

(*) Notice: Subject to any disclaimer, the term of this patent is extended or adjusted under 35 U.S.C. 154(b) by 618 days.

(21) Appl. No.: 12/963,085

(22) Filed: Dec. 8, 2010

(65) Prior Publication Data

US 2012/0150939 A1    Jun. 14, 2012

(51) Int. Cl.
*G06F 15/16* (2006.01)
*G06F 9/455* (2006.01)

(52) U.S. Cl.
CPC ................... *G06F 9/45512* (2013.01)

(58) Field of Classification Search
CPC .................................................. G06F 9/45512
USPC ......................................... 709/203, 223–224
See application file for complete search history.

(56) References Cited

U.S. PATENT DOCUMENTS

| | | | | |
|---|---|---|---|---|
| 5,760,773 A * | 6/1998 | Berman et al. | ............... | 715/808 |
| 6,046,747 A * | 4/2000 | Saunders et al. | ............. | 345/582 |
| 7,496,053 B1 * | 2/2009 | Seabaugh et al. | ............ | 709/223 |
| 7,526,498 B2 | 4/2009 | Dubovsky | | |
| 7,620,989 B1 | 11/2009 | Couturier | | |
| 7,627,833 B2 * | 12/2009 | McKnight et al. | ........... | 715/809 |
| 7,783,030 B1 | 8/2010 | Bruening | | |
| 7,926,038 B2 * | 4/2011 | Rossi et al. | .................. | 717/126 |
| 8,079,037 B2 * | 12/2011 | Lui et al. | ...................... | 719/310 |
| 8,464,167 B2 * | 6/2013 | Saund et al. | .................. | 715/758 |
| 2003/0055836 A1 | 3/2003 | Dubovsky | | |
| 2004/0102978 A1 * | 5/2004 | Gygi | .................... | G06F 11/3688 704/275 |
| 2004/0264782 A1 * | 12/2004 | McKnight et al. | ........... | 382/229 |
| 2006/0265664 A1 * | 11/2006 | Simons et al. | ................ | 715/772 |
| 2007/0016861 A1 * | 1/2007 | Salomaa et al. | .............. | 715/700 |
| 2007/0050710 A1 | 3/2007 | Redekop | | |
| 2007/0083813 A1 * | 4/2007 | Lui et al. | ....................... | 709/224 |
| 2007/0174713 A1 * | 7/2007 | Rossi et al. | ..................... | 714/38 |
| 2007/0260737 A1 * | 11/2007 | Gomes | ..................... | G06F 8/24 709/229 |
| 2008/0307388 A1 | 12/2008 | Ralls | | |
| 2009/0037551 A1 * | 2/2009 | Gupta | ................. | G06F 9/45512 709/208 |

(Continued)

*Primary Examiner* — Minh-Chau Nguyen

(57) ABSTRACT

A graphical data type inference transparently transforms a legacy text-oriented command line interface (CLI) into a graphic-oriented or graphic-aware CLI (G-CLI). A user fuses graphical references with the legacy scripting language by identifying objects using syntax familiar to the user. The objects are presented to the user via a user interface and may be queried/selected by the user. The user issues commands on the selected objects by referencing the graphical selection in a command line within a shell. The graphical selection in short hand is translated into a form operable by a server or computer. The syntax of the legacy command language is extended with operators that operate entirely within the G-CLI. Consequently, the command line used in the shell has an existing operation set, as well as new graphic-based operations.

18 Claims, 6 Drawing Sheets

(56) References Cited

U.S. PATENT DOCUMENTS

2010/0024031 A1* 1/2010 Shribman et al. .............. 726/18
2010/0199167 A1* 8/2010 Uematsu ................. G06F 17/24
                                                715/234

* cited by examiner

EXTENDING LEGACY SCRIPTING LANGUAGES WITH GRAPHICAL REFERENCES

BACKGROUND OF THE SUBJECT DISCLOSURE

Field of the Subject Disclosure

The present subject disclosure relates to computer programming. In particular, the present subject disclosure relates to incorporating graphical and other references to existing command line syntax.

Background of the Subject Disclosure

Computer interfaces have undergone several iterations from the inception of the computer. The first computers had basic input and output capabilities requiring mechanical input, printed output, and lots of user effort. With the advent of the CRT and keyboard, a command line input was conceived, with a text-based output using archaic and complex language syntaxes. Over time, graphical capabilities improved to the point that a user did not have to use a command line at all. Instead, entire sets of operations were performed graphically, using input devices such as mice, touchscreens, etc. Today, one would be hard-pressed to find an average computer user, or even a technically savvy home user, using a command line interface (CLI). The graphical user interface (GUI) has essentially taken over.

However, certain applications still require the use of commands. Especially for systems administrators who monitor and perform operations on objects in complex file systems, process trees, etc., a GUI depicting these structures typically has a shell command interface associated with them to operate upon. Examples include the DOS prompt of a MS WINDOWS system, KORN SHELL (ksh), LINUX BASH, etc. Particularly for scripting languages and dynamic programming languages such as PERL and PYTHON, a CLI provides users with much more control of their file system and operating system and enables a user to easily script a sequence of commands to perform a task or execute a program. Often when accessing another computer or networking device over a network a user will only be able to manipulate the device and/or its files using a command line, CLI, or other text only manipulation.

On the other hand, GUI users have windows that enable a user to easily view, control, and manipulate multiple things at once, and are commonly much faster to multitask with when compared to a command line. Although many command line environments are capable of multitasking they do not offer the same ease and ability to view multiple things at once on one screen. Another issue with legacy command line scripting languages is that when working with very dense system trees and process trees involving complex paths, the command lines become unwieldy and complex, resulting in large amounts of code. Particularly with remote control of a server from a client terminal, dense command syntax, especially in batches, results in overloading the network and consuming valuable system resources.

Past solutions have attempted to fuse GUIs and CLIs by providing a plethora of menu-driven options, and a static set of operations to be performed on objects that are graphically selected on the GUI. However, performing large complex operations using these methods still does not provide the speed and ease of use of a traditional CLI. The problems of either type of interface still exist today.

Therefore, what is needed is an improved user interface that enables graphically represented object structures while taking advantage of existing command language syntax.

SUMMARY OF THE SUBJECT DISCLOSURE

The present subject disclosure solves the above problems by uniquely fusing a graphical layer with a legacy command language interface to form a graphical command line interface (G-CLI). This allows a user to more efficiently perform operations at varying scales. A scale that can be identified graphically is able to be seamlessly imported into a well-defined legacy command language. The objects are presented to the user via a user interface and are arranged in some manner, such as a tree. The user issues commands on the selected objects by referencing the graphical selection in a command line within a shell. The graphical selection in short hand is translated into a form operable by a server or computer. The syntax of the legacy command language is extended with operators that operate entirely within the interface. Consequently, the command line used in the shell has an existing operation set, as well as new graphic-based operations. In other words, the language of the traditional CLI is extended into the shell of the interface. Therefore, it is easy for a user with existing knowledge of the command language to adopt the new operations/extensions In one exemplary embodiment, the present subject disclosure is a method for interpreting a command line, including presenting a listing of a plurality of objects to a user via a graphical user interface (GUI), receiving a command line from the user, the command line including a reference to at least one of the objects in the GUI, and executing a command on at least one of the objects. The GUI is on a client in communication with a server. The method further includes receiving the listing of the plurality of objects from the server, and transmitting the command line to the server. The listing received from the server is stored on a cache on a client memory, with a coherency protocol being used to keep the list updated. The method further includes parsing the reference to determine which object the command is to be executed upon, and distilling and normalizing the command line submitted by the user into a command line that can be executed by the server.

In another exemplary embodiment, the present subject disclosure is a computer program product for interpreting a command line, the computer program product being stored on a computer-readable medium and including logic for presenting a listing of a plurality of objects to a user via a graphical user interface (GUI), tagging one or more of the plurality of objects with a tag, receiving a command line from the user, the command line including at least an operator, an argument, and a switch, the argument including the tag, parsing the command line to determine the one or more of the plurality of objects the command is to be executed upon, and distilling and normalizing the command line for subsequent execution of the command line by a server.

In yet another exemplary embodiment, the present subject disclosure is a system for executing a command on a plurality of objects, the system including a client having at least a client processor, a client memory, an input device, a display, and a client network interface, a server in communication with the client, the server including at least a server processor, a server memory, and a server network interface, wherein the server memory stores a listing of a plurality of objects that can be operated upon by the server processor, client logic on the client memory for receiving the listing of the plurality of objects from the server, presenting the listing to a user via a graphical user interface (GUI) on the display, receiving a command line from the user, the command line including at least an operator and an argument, the argument including a reference to one or more of the plurality of objects, parsing the command line to determine the one or more of the plurality of objects, distilling and normalizing the command line for subsequent execution of the command line by a server, and transmitting the distilled and normalized command line to the server. A server logic on the server memory receives the distilled and normalized command line, and executes the command line on one or more of the plurality of objects. The plurality of objects includes one or more of a file, a directory, a process, a resource, a node, a network entity, and a user account.

The present subject disclosure also solves the problem of mapping Single Sign On (SSO) authentication and a corresponding wide array of sophisticated authorization policies to the physical objects manipulated by scripting languages.

DETAILED DESCRIPTION OF THE SUBJECT DISCLOSURE

Figure 1:
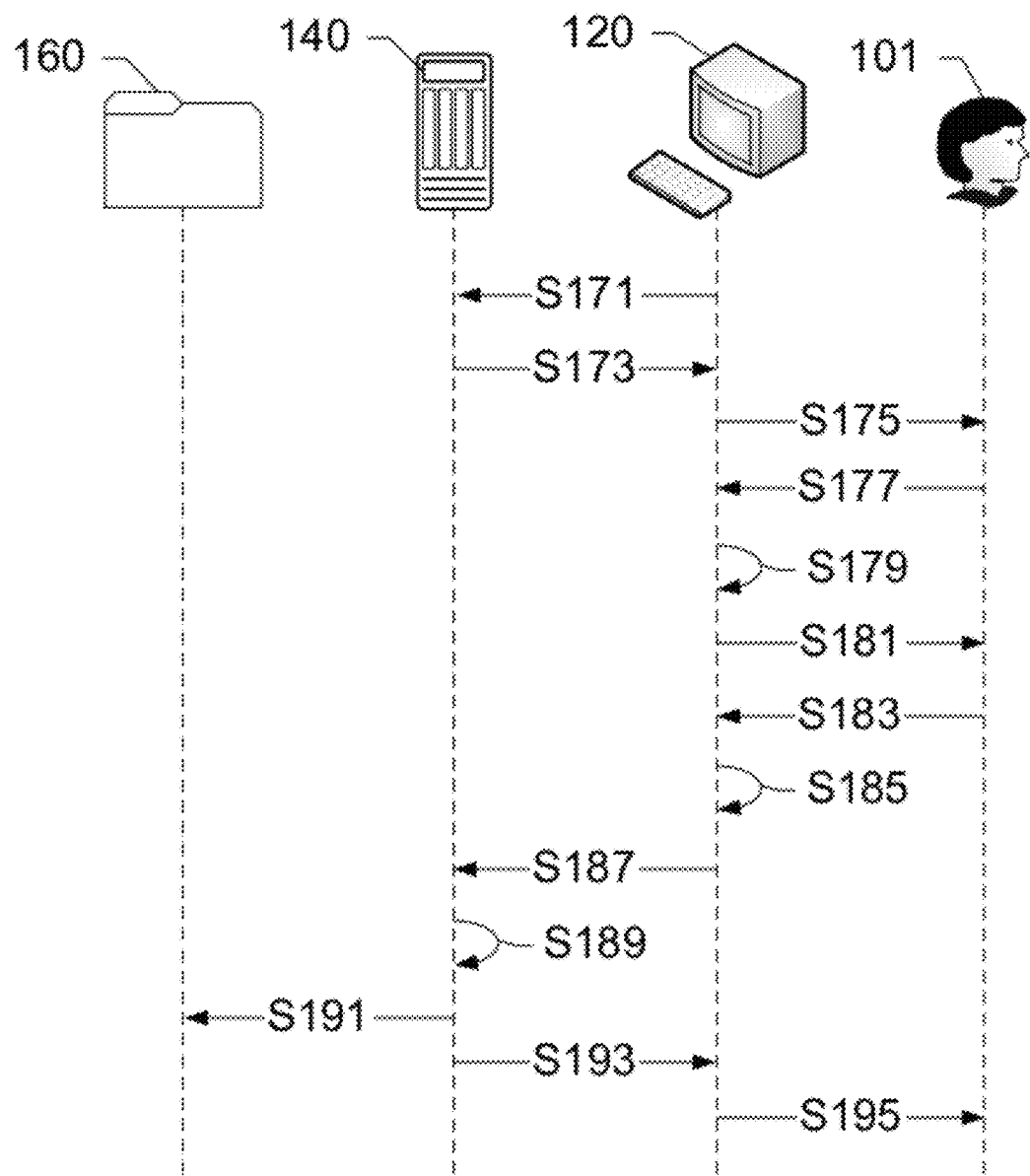
FIG. 1 shows a process flow diagram of a method for interpreting a command line, according to an exemplary embodiment of the present subject disclosure.

The following detailed description presents a novel technique for extending legacy scripting languages with graphical references. The disclosure describes a graphical data type inference that transparently transforms a legacy text-oriented command line interface (CLI) into a graphic-oriented or graphic-aware CLI (G-CLI). Briefly, instead of entering a typical low-level command directly into a command line interface (CLI), a user fuses graphical references with the legacy scripting language by identifying objects using syntax familiar to the user. The objects are presented to the user via a user interface and are arranged in some manner, for instance, a tree. The user issues commands on the selected objects by referencing the graphical selection in a command line within a shell. The graphical selection in short hand is translated into a form operable by a server or computer. This may be performed by a translation unit embedded within the interface itself. The syntax of the legacy command language is extended with operators that operate entirely within the G-CLI. Consequently, the command line used in the shell has an existing operation set, as well as new graphic-based operations. In other words, the language of the traditional CLI is extended into the shell of the interface. Therefore, it is easy for a user with existing knowledge of the command language to adopt the new operations/extensions. This minimizes the need for a new learning curve, as well as provides more efficient and simple command sequences via an optimal coding of textual information that includes the inherent property of graphical representation.

Further, the present subject disclosure extends the legacy CLI grammar/syntax to support graphical-representation-dependent security models. This is more flexible and offers a granular scope of protection compared to existing methods that use the physical object's operating system. For instance, a system administrator may assign permissions to users on the network for resources based on a graphical layout of the resource tree or table. Other examples are highlighted in the following embodiments. Finally, the execution of a legacy CLI is transparently extended from a single physical unit to a partially or pseudo-distributed execution model. In other words, a portion of the command sequence is executed on the G-CLI, either at a client terminal or at a GUI coupled to a server, while the remaining operations are executed at the server. Benefits of this model include, among others, early error detection or client-side error detection, and a reduction of physical server load and network bandwidth consumption.

As used herein and throughout this disclosure, the term command-line interface (CLI) is a mechanism for interacting with a computer operating system or software by typing commands to perform specific tasks. Examples include Microsoft Disk Operating System (MS-DOS), UNIX, KORN SHELL, etc. This text-only interface contrasts with the use of a mouse pointer with a graphical user interface (GUI) to click on options, or menus on a text user interface (TUI) to select options. A command-line interpreter (or "shell") is used to receive, analyze, and execute the requested command. The shell is executed in a text terminal or in a terminal emulator window as a remote shell client. Upon completion, the command usually returns output to the user in the form of text lines on the CLI. This output may be an answer if the command was a question, or otherwise a summary of the operation.

At its most basic, a "command line" includes the command or directive that informs the computer of what operation is to be performed, followed by an argument, and any optional switches or flags. The argument identifies the object(s) that the command is performed upon, and the switches modify or append to the default behavior of the command. For instance, the Unix shell command line "cd/home/pete" changes the user's place in the directory tree from their current position to the directory "/home/pete". "cd" is the command and "/home/pete" is the argument. An MS-DOS command to display all content within a current directory could be "dir /a" where "dir" is the operation and "/a" is the switch indicating all content. Other combinations of directives, arguments, and switches are possible.

An object is any resource, item, or node within an operating system that can be represented graphically and can be operated upon by a command. This includes operating system structures, such as files and directories. Objects are represented within a graphical user interface in the form of a tree. Examples of objects that may be graphically represented in a tree include operating system structures, resources (such as network resources, printers, etc.), processes, network nodes, routers, and so on. Associated with each of these objects are operations that manage them, and each operations is associated with the command line interface.

A command line extension, or "extension", for the purposes of the present subject disclosure, is an additional argument or switch to the existing syntax of legacy command languages. The extension includes references to aspects of a graphical user interface, such as a location on the GUI, a color within the GUI, and "tagged" objects within the GUI. "Tags" may be assigned to objects manually by the user before they are used in the command line. The command line interpreter converts the extension into arguments/switches that are usable by the operating system.

For the following description, it can be assumed that most correspondingly labeled structures across the Figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIG. 1 shows a process flow diagram of a method for interpreting a command line, according to an exemplary embodiment of the present subject disclosure. A user 101 operates a client terminal 120. Client terminal 120 is in communication with server 140, directly or over a network. Server 140 is in communication with and possibly includes within a server memory one or more resources 160. In operation, client terminal 120 includes client logic for updating a cached list of objects 160 from server 140. This may occur by transmitting a request S171 for the latest copy of the list. Server 140 transmits S173 the copy of the list to client terminal 120. Step S171 is optional; server 140 may transfer S173 the copy of the list to client terminal 120 based upon logic on server 140 itself. This can happen, for instance, anytime a process or operation is performed on object(s) 160, thereby modifying the list. In some exemplary embodiments, the list transmitted in S173 includes a plurality of attributes or meta-data for each object.

Client terminal 120 then displays S175 the list to user 101 via a GUI on a display coupled to client terminal 120. The list may be arranged as a table, a tree, a graph, or any type of visual representation known in the art. Since "object" has been defined as any file, directory, resource, process, node, etc., the plurality of objects is graphically represented in any convenient format. The graphical representation may further be constructed based upon the meta-data for each object as received from server 140. The GUI on client terminal 120 has a search feature that allows user 101 to refine/restrict the displayed list to specific items. The user submits a query S177 to display only certain types of objects, for instance, objects modified after a certain date/time combination, or objects larger than a specified size. Logic on client terminal 120 processes the list S179 by comparing the user's query with attributes of the objects, and generates a refined list to be displayed S181 to user 101. The user can further tag the search results with a specific identifier, as will be further explained below. In either case, now the user is ready to submit a command to be executed on the selected objects/refined list.

The user submits a command S183 via a shell or a command-line interface (CLI) displayed in conjunction with the GUI on client terminal 120. The user constructs the command line just like a traditional legacy command line, such as Perl, Python, korn shell (ksh), or similar scripting language. However, instead of typing in traditional arguments referring to a name or attribute of each object, the user instead types in or incorporates into the command line a graphical reference, or a tag corresponding to the refined list/selected objects. In other words, a reference to a plurality of objects is condensed into a single graphical reference or tag that all selected objects have in common. The graphical reference may be embedded into the command line either by typing or via a mouse selection, for instance, by dragging and dropping an object selection into the command line. Syntax extensions for graphical references may be learned by the user so that they can type the reference into the command line; however, these extensions are simple and mimic the existing syntax, as is shown in the following examples.

Logic onboard client server 120 parses S185 the received command line to determine the objects being operated upon, and distills and normalizes the command line so that it is able to be executed by server 140. The logic then transmits S187 the normalized command line to server 140 for execution. This process may be carried out by a translation unit within client terminal 120, or within the shell itself. At server 140, logic onboard server 140 executes S189 the command line. The command line modifies or performs the request operation S191 upon resource 160. Server 140 reports the results S193 back to client terminal 120. This reporting may additionally include a new and updated list of objects reflecting the result of the operations performed in S191. In some embodiments, upon executing the command, server 140 updates a plurality of client terminals with a refreshed list of objects and their attributes. This ensures that any client-side programming is valid and properly executed when submitted to the server. In another embodiment, routers on a network can be acted upon using the proprietary CLI of the router, such as the Cisco CLI. In this case, a subset of the Cisco CLI is provided into the G-CLI, and extended to allow importing graphical selections. The translator then translates the graphical selections into appropriate syntax before submitting the command to the server.

Figure 2:
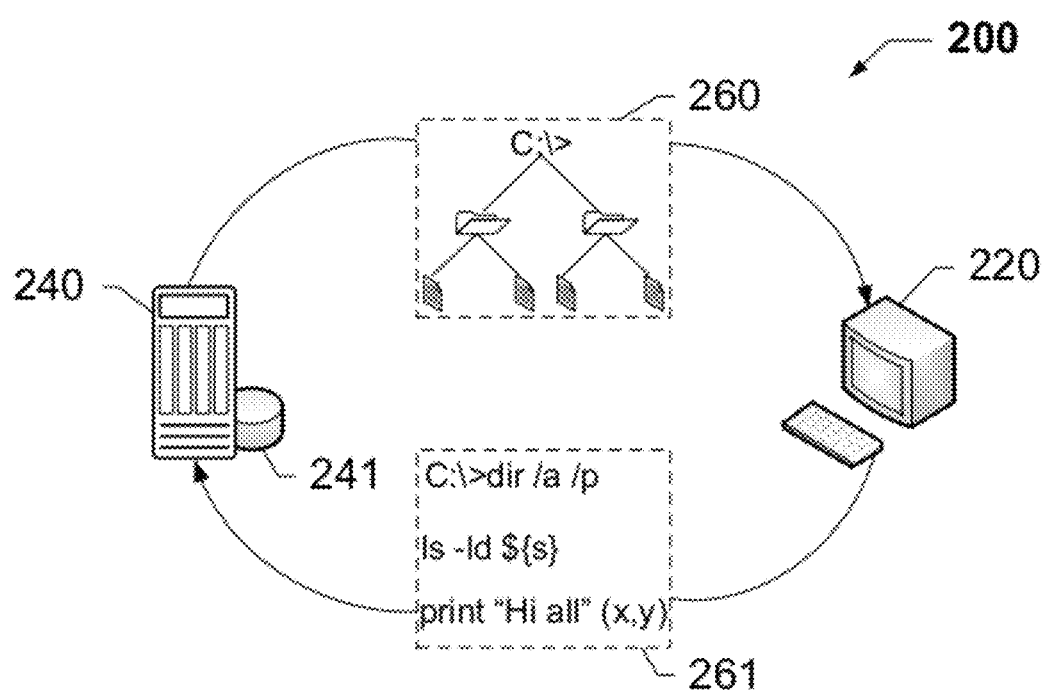
FIG. 2 shows a system for providing a graphic-aware CLI (G-CLI), according to an exemplary embodiment of the present subject disclosure.

FIG. 2 shows a system 200 for providing a graphic-aware CLI (G-CLI), according to an exemplary embodiment of the present subject disclosure. A client terminal 220 is in communication with server 240, directly or over a network. Server 140 is in communication with a database 241 that includes one or more objects that can be operated upon by logic onboard server 240. In operation, client terminal 220 includes client logic for updating a cached list of objects 260 from server 240. The list of objects 260 includes a plurality of attributes or meta-data for each object. A refresh cycle may be programmed into either the client 220 or the server 240 to update any changes occurring in objects 260. Alternatively, when a write cycle occurs from one client, all other clients 220 are refreshed via a push operation from server 240. This process may be used for disconnected operations, i.e. batch processing of a plurality of commands (or a "batch" of commands) submitted to server 240 for subsequent execution when connected. This is useful for intermittent connections between client 220 and server 240, for instance, for a mobile network administrator attempting to perform operations on back-end resources using a remote device. Client terminal 220 displays list 260 to a user via a GUI on a display coupled to client terminal 220. List 260 may be arranged as a table, a tree, a graph, or any type of visual representation known in the art. Since "object" has been defined as any file, directory, resource, process, node, etc., the plurality of objects is graphically represented in any convenient format. The user may then submit a query to display only certain types of objects, for instance, objects modified after a certain date/time combination, or objects larger than a specified size. Logic on client terminal 220 processes list 260 by comparing the user's query with attributes of the objects, and generates a refined list to be displayed. The user can further tag the search results with a specific identifier, as will be further explained below.

The user then submits a command via a shell or a command-line interface (CLI) displayed in conjunction with the GUI on client terminal 220. The user instead types in or incorporates into the command line a graphical reference, or a tag corresponding to the refined list/selected objects. Logic onboard client terminal 220 parses the received command line to determine the objects being operated upon, and distills and normalizes the command line to produce a normalized command line 261 to be transmitted to server 240 for execution. Normalized command line 261 does not include the graphical references/tags. Instead, normalized command line 261 is in a form that can be understood and executed by the operating system stored on server 240. The command line modifies or performs the requested operation upon the selected/tagged resources. Subsequently, server 240 reports an updated list of objects 260 reflecting the result of the operations performed to all clients on the network. These clients, including client 220, cache this information as a point-in-time snapshot of the state of the resources on the server, and a coherency protocol can be used to maintain consistency.

As mentioned above, the G-CLI on the client serves not only to simplify the code typed by the user, but also to reduce the load on the back-end server by performing portions of the operations at the client itself. In other words, the G-CLI on the client is used to identify what is to be performed, before the operation is transmitted to the server. There may be many situations where this is useful, for instance, when a system administrator desires to restrict access to certain objects based on a time constraint. The user runs a search on the GUI for objects meeting the constraint, tags or simply displays the objects on the screen, and issues a command line with the argument including the tag or an indicator indicating the contents of the screen. Using the attributes of each directory (writeable, etc.), a command may be issued within the GUI to find a set of objects that are graphically selected based on their attributes, and then the command is transmitted to the server. The operations carried out on the server are thereby reduced with the help of the GUI and the consistent cache state.

Figure 3:
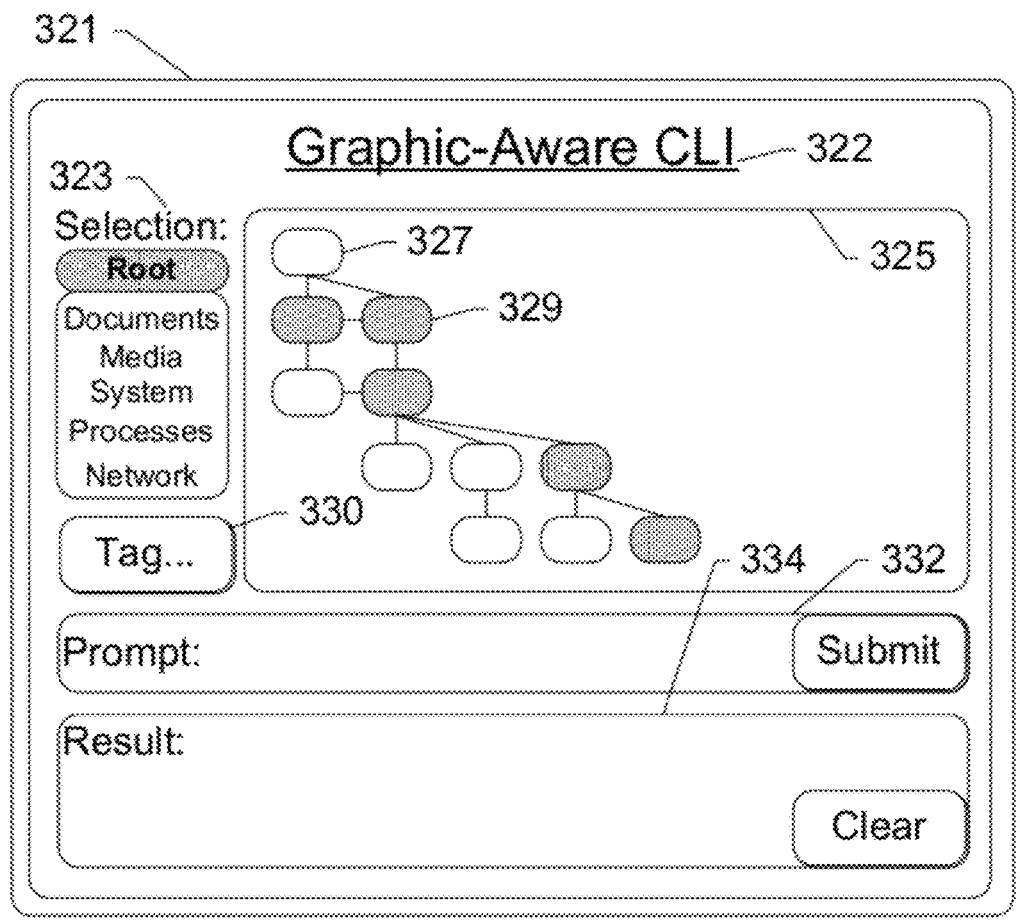
FIG. 3 shows a G-CLI on a GUI of a client, according to an exemplary embodiment of the present subject disclosure.

FIG. 3 shows a G-CLI on a GUI of a client, according to an exemplary embodiment of the present subject disclosure. The client includes a display 321. Display 321 shows a title 322, a selection box 323, an object window 235, a tag option 330, a command line prompt 332, and a results window 334. Object window 325 shows an object list, including deselected (clear) objects 327 and selected (shaded) objects 329. A user may search for objects using any combination of selection box 323 and command prompt 332. For instance, a user can select processes, and then command the GUI to display all processes that occupy a certain amount of system resources, or that were initiated by a specific user. This could be performed using the command line, a mouse selection (such as a right-click context-sensitive menu), etc. Then, the user inputs a command into prompt 332 to kill all processes displayed on the screen. Alternatively, the user may tag all displayed processes using tag option 330, then load another screen with other processes matching a different criteria, tag the second set of results, and then execute a command including the tag as an argument, thereby performing the operation on both sets of results at the same time.

In another example of a graphical extension on a legacy language, a user selects a plurality of folders 329, and wishes to display the contents of the folders. In a legacy korn shell (ksh) scripting language, the user would simply insert "ls-ld $ {s}" where ${s} indicates the selection. Logic on the client terminal would translate the ${s} into an actual command line including the proper arguments for processing by the server. In another example, still using the ksh language, a user wishes to test whether the selection is accessible at the current time. The user would type in the command line:

```
if [ -T.v ${s} ]; then print ${s} is currently accessible;
else print ${s} is currently inaccessible; fi
```

This is an example of applying a sophisticated security policy in physical objects, in this case, a file system directory. The virtual operator is "-T.v $ {s}" to test whether or not the selection is accessible. In this case, the output window 334 would display the result. In another example, a simple GUI command rewrite is used to avoid a disk write on the server. The user types the command: if [-w ${s}]; then echo ${s} is writable; fi The operator "-w" uses the securely cached state within the GUI (i.e. on the client terminal) to determine if the selected directory is writeable. This avoids a costly disk access on the server, saving system/network resources and processing power.

One may additionally incorporate color references into the command language syntax. This adds another dimension of the GUI into the command line. The command line will be distilled and normalized before being carried out as a true operation on the back end server. For instance, a user tags different objects with different colors using the tag option 330, then executes a simple GUI command rewrite that exploits both color and structure of the graphic interface using the command line:

```
if [ ${s [yellow] } -.v ${s [red] } == 2 ]; then echo
Difference in depth between [ ${s [yellow] } and ${s [red]
}] is 2; fi
```

In this case, the virtual operator "-.v" performs arithmetic on "edges" of selections, similar to an image processing logic. Any color differences around edges of selections is converted into a quantity, distilled and normalized into a traditional text-based command language referencing the selected resources, and the result is output in the result window 334. This concept can be expanded to edges, or any visual aspect of the object window, as syntax within the extension to the language. For instance, a property of the GUI could assign variables to edges upon loading of the GUI itself. Thickness/color of edges can be incorporated within the extended syntax. Other visual cues will become apparent to a person having ordinary skill in the art upon a complete reading of this disclosure.

There are several additional applications where the present subject disclosure can be applied. For instance, in a large-scale application running a traditional or cloud-based (virtual) data center, the present subject disclosure may be used by a system administrator to update several file-system objects, such as directories and files, both statically and dynamically, while the application is running. Similarly, one can conceive a situation where an application is being shut down and the system administrator desires to get a head start on transferring modified but quiesced file system objects to a new disk array. Generally a shut-down process takes a very long time to complete because application processes enormous amounts of data. However, the G-CLI of the present subject disclosure in combination with the current cache enables the administrator to batch-perform these operations within the G-CLI itself, monitor any hypothetical results, and then submit the batch to the server when the application becomes ready, or when the file system objects have completed being modified.

Figure 4:
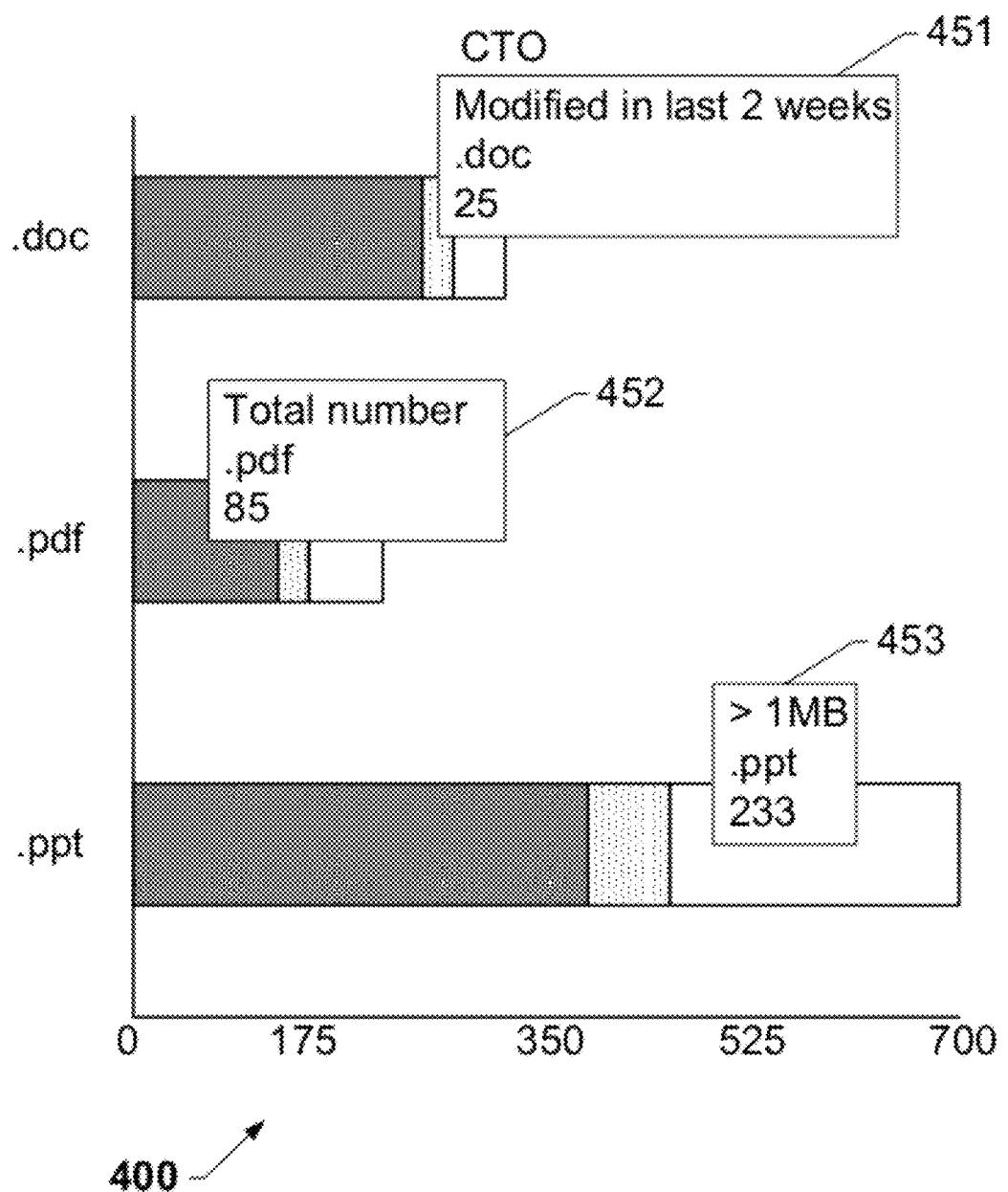
FIG. 4 shows a first graphical data type creation via a G-CLI, according to an exemplary embodiment of the present subject disclosure.

FIG. 4 shows a first graphical data type creation via a G-CLI, according to an exemplary embodiment of the present subject disclosure. Briefly, one may create a graphical data type by "overloading" the i/o redirect and append operators when the target is a file with a suffix ".gdt". In this embodiment, it is assumed that the list of object metadata has been transmitted from the server to the client and is pending G-CLI processing. A user specifies a stacked bar chart 400 using a legacy command line within the GUI itself. For instance, in a korn shell, the user uses the "cat" command, which reads each file parameter in sequence and writes it to standard output. An example would be:

```
cat barchart.gdt
NAME|TYPE|CATEGORIES|FILTER|ROWS|CTO|stacked-
bar|.doc,.pdf,.ppt|/mnt/cto/documents/|"Total
number","Modified in last 2 weeks","> 1MB"
```

This creates a stacked bar chart type representing the multiple dimensions (identified by the CAP labels). Upon execution at the client, a legacy CLI "append" operator (>>) is transparently overloaded to provide N-dimensional graphic generation capability. Each "find" operation executed in the G-CLI window will produce another dimension in the graph 400. For instance, the set of command lines:

```
find /mnt/cto/documents \( -name '*.doc' -o -name '*.pdf' -
o -name '*.ppt' \) >> barchart.gdt
find /mnt/cto/documents -ntime -14 \( -name '*.doc' -o -
name '*.pdf' -o -name '*.ppt' \) >> barchart.gdt
find /mnt/cto/documents -size +1048576c \( -name '*.doc' -o
-name '*.pdf ' -o -name '*.ppt' \) >> barchart.gdt
```

Generates additional dimensions in the graphs such as shown in boxes 451-453. The results show that 25 ".doc" files have been modified within the last 14 days, 85 ".pdf" files exist in total, and 233 ".ppt" files exist that exceed 1 MB in size. Given these results (and combinations thereof), the user can select to perform operations on any of these items based on the attributes of the files. For instance, the G-CLI can transparently extend an "&" operator to support a set intersection for two attributes. The following command will remove the set of ".doc" files that have been modified in the last two weeks AND that exceed 1 MB in size: "rm $((${CTO.doc [1]} & ${CTO.doc [2]}))". It should be understood that although the present embodiment highlights a ksh script, other scripting languages may also be extended into a G-CLI of the present subject disclosure. Generally, a GDT-specific attribute set transparently/automatically is added to a namespace which mimics the "class inheritance" in object-oriented languages. When dealing with a graph or a tree, the attributes for each object such as depth, siblings, parent, ancestor, etc. become part of the namespace. After running the command to create the graphic as shown above, the client creates an XML document encoding tag, type, and source, and transmits it to the server. In this way, a graphical data type creation is performed by overloading the i/o redirect operator, thereby establishing the bridge between the text-oriented mode (the lowest abstraction) and the graphic-oriented mode of operation (the highest abstraction). The server would run the command, and encode the output into another XML document (or modify the existing XML) and transmit the document back to the client. The client would parse the XML document and generate the resultant graphical representation on the GUI.

In another exemplary embodiment of the present subject disclosure, an administrator can operate on a file system or file tree virtually, using an HTML document object model (DOM) format, or similar visual representation. This is an example of how a client distils and normalizes a graphic reference in a command line. For instance, a file system meta-data is periodically streamed from a server to a client, as described above. The meta-data includes at least an access date/time, a modification date/time, and a creation date/time. The physical object modification rate may be represented as a color corresponding to a temperature in a heat map. The graphic object (shown with the particular color) is "cooled" at the client via an algorithm that operates on the client and changes the object color at some specified rate. Logic on the client then stores the object identifier along with the color in an HTML DOM format. The legacy CLI can be operated upon the DOM as if it were the object itself, with DOM-based operations being transformed into physical object operations using the original CLI syntax.

Figure 5:
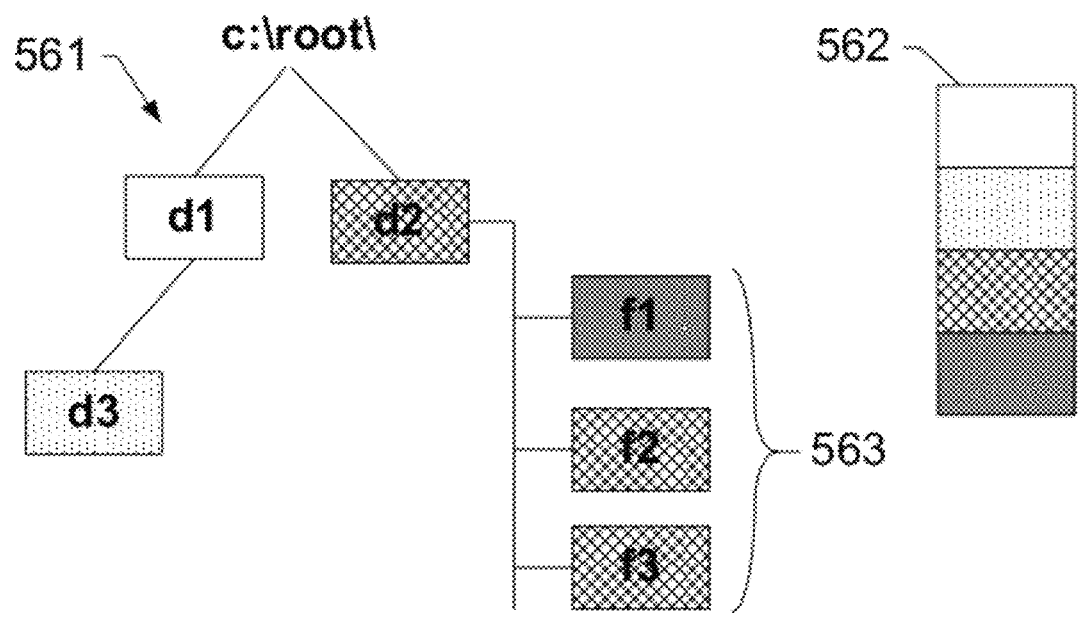
FIG. 5 shows a second graphical data type creation via a G-CLI, according to an exemplary embodiment of the present subject disclosure.
Figure 5:
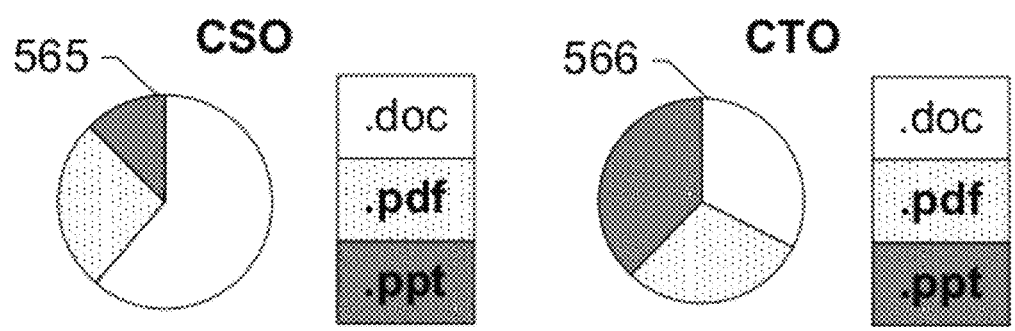

FIG. 5 shows a second graphical data type creation via a G-CLI, according to an exemplary embodiment of the present subject disclosure. Again, it is to be understood that a server, either on a physical or a virtual (cloud) data center, has transmitted a plurality of attributes to a client, whereby the plurality of attributes includes meta-data about a file tree, process tree, or other set of objects stored within the server/cloud. The changes to the objects, such as modifications to a file tree, can be encoded as meta-data as a function of time, and the user will be presented with both the object tree itself, as well as any potential graphic representations of the meta-data. In the present embodiment, a DOM is generated of graphical tree 561, with the changes in objects as a function of time being represented by colors on a color map. The key of the color map is 562. An example of code to generate the DOM is:

```
<html>
<head>
<script type="text/javascript">
function setColor( )
{
document.getElementById("d2").style.color="#ff0000";
}
</script>
</head>
```

This code reflects a color change in the folder "d2" of object tree 561. A similar code is executed for each object, including files f1, f2, and f3 563. In other words, the client interprets the meta-data stream into a rate-of-change of the physical file system and represents each object as a color in the heat map.

Using this feature, an administrator may perform the task of moving quiesced files into a new disk array mode as described above. By visually selecting a temperature (color) from array 562 and identifying the variable as "$SEL-TEMP" within the G-CLI, the administrator uses the following G-CLI program (based on a legacy ksh, noting that "#" at the start of a line indicates command input, and ">" indicates command continuation):

```
# for node in $G_1
>do
>       if [ ${ node.temp} -le $SEL-TEMP ]
>       then
>            mv ${node.name}...
```

In other words, the graphical data type inference turns type-specific legacy CLI "for" operator into a G-CLI graphical data-type operator, with the graph traversal aspects being hidden from the administrator. Behind the scenes, at the client, all information that is required to determine which branch path to take is contained within the argument (${node.temp} and $SEL_TEMP. The command that is eventually transported over to the server for actual execution is:

```
#cat G_1 | while read -r name temp parent child
>do
>node=(name=$name temp=$temp parent=$parent child=$child)
>...
```

In other words, on the physical (or virtual) server, the graphical data type (G_1) is physically represented/normalized as rows in a file, thereby severing all connections to its graphical form on the client. The present subject disclosure automates this process, reducing the number of operations carried out on the physical server and the amount of data transmitted over the network. All the administrator sees is the result of the command, and the corresponding change within the heat map 561. Further, familiar and consistent variable syntax provides for other supported properties, such as "node.parent", "node.child[ ... ]", "node.edge[ ... ]", and so on.

Additionally, an administrator can represent the results of the query as pie charts 565-566, using the following code:

```
#cat piechart.gdt
NAME | TYPE | CATEGORIES | FILTER
CSO | pie | .doc, .pdf, .ppt | /mnt/cso/documents/
CTO | pie | .doc, .pdf, .ppt | /mnt/cso/documents/
#find /mnt/cso/documents /mnt/cto/documents \( -name
 '*.doc' -o -name '*.pdf' -o -name '*.ppt' \) > piechart.gdt
```

Executing these commands in a shell window (in this case, ksh) will output within the object window (or other window in the G-CLI) both CSO chart 565 and CTO chart 566, with specific colors for each document type. The pie chart is transparently generated when the ".gdt" extension is a target of the legacy redirect operator ">".

Figure 6A:
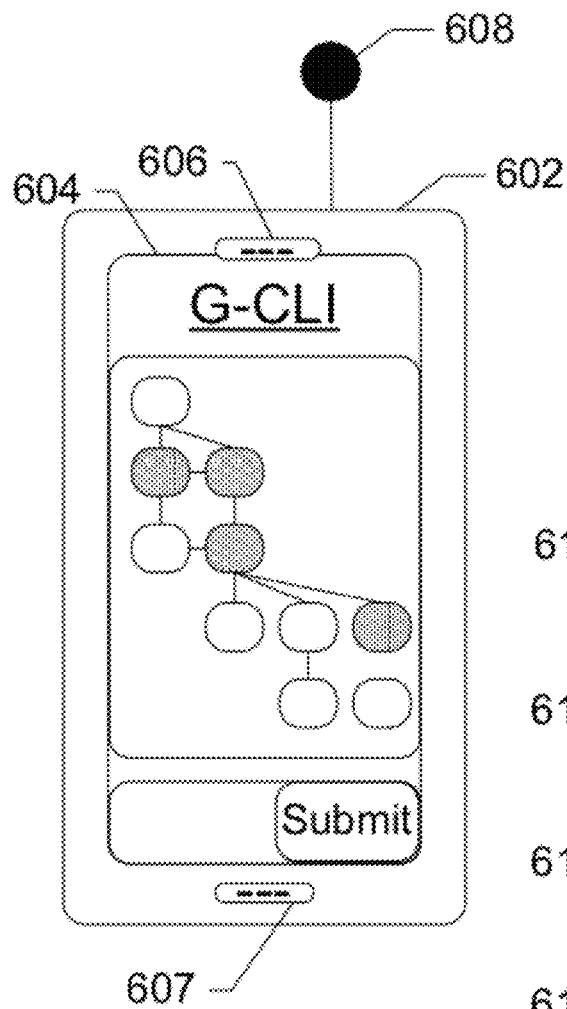
FIGS. 6A and 6B show the components of a mobile device operating a G-CLI, according to an exemplary embodiment of the present subject disclosure.
Figure 6B:
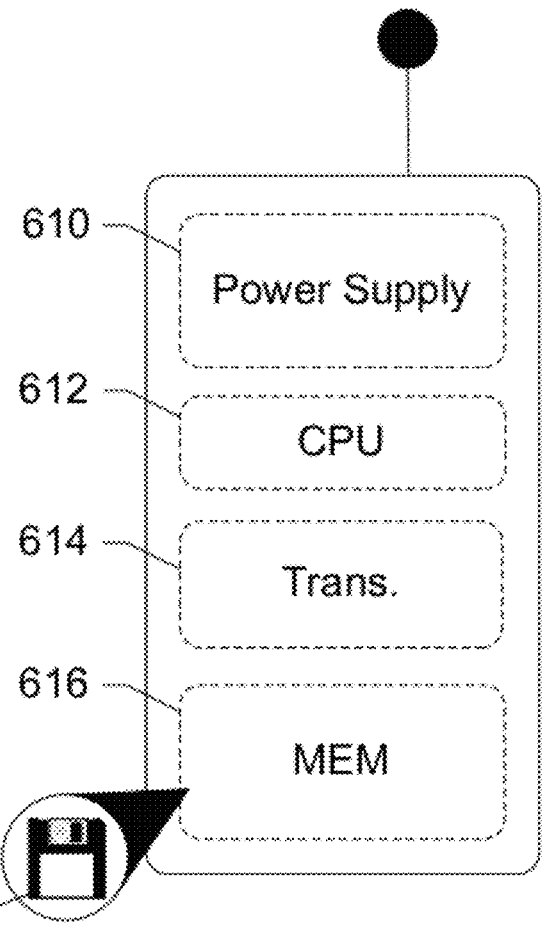

Besides a client terminal, a system administrator may manage critical systems via a mobile device. FIGS. 6A and 6B show a G-CLI represented on a display 604 of a mobile device 602. Display 604 is a touch-screen display with a virtual keyboard (not shown) for input, however, a hardware keyboard/slide out keypad can be included. A speaker 606, microphone 607, antenna 608 and transceiver 614 enable communication with other devices and users across a network. Power supply 610 provides power to CPU 612 and other components, while memory 616 in communication with the CPU stores the client logic 618 for generating the G-CLI, performing the functions described above, as well as additional logic for operating the components of mobile device 602.

As described above, once a GUI search/query is performed, the results can be tagged with a particular identifier/tag. This enables performing aggregate operations in an easy manner. Moreover, an administrator/user of the client terminal may further use spoken language to carry out the tasks described above. For instance, a text-to-speech interface can convert a spoken tag instead of having to verbalize physical file names. By using simple tag names instead of the names of the objects being selected, the effort of creating command lines to be submitted to a server is significantly minimized. This is especially useful for certain situations, for instance, if there is a problem on the server, such as processes being spawned at an unbearable rate. An operation could be executed to find all operations executed within the last hour. The process is the same as the query and command described above, with the only exception being that a verbal cue states "kill *tag*", and the problem is solved. This, and other operations, may be performed via a G-CLI on a mobile device such as the one described in FIG. 6, or any browser, x-window, GUI, portal, etc., on any terminal having input capabilities.

The present subject disclosure therefore creates a new paradigm that seamlessly connects two previously independent environments: browser contents (i.e. DOM model) and a server-side scripting language. By merging the dynamic and interactive capabilities of a traditional scripting language/domain-specific CLI with the latest advancements in web graphics, visualization, web security, and speech-to-text conversion, the ability to identify problems visually is vastly superior to investigating a system using the traditional command window and associated CLI. In summary, the present subject disclosure provides ease of control of complex systems, faster human decision-making, improved interactivity, and lower costs through efficiency and avoidance of complexity.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

What is claimed is:

1. A method for interpreting a command line, the method comprising:
   displaying a graphical user interface comprising a graphical hierarchical tree listing of a plurality of objects, each object of the plurality of objects graphically representing a different operational command to an operating system;
   receiving a selection of one of the plurality of objects in the graphical hierarchical tree;
   associating the selection of the one of the plurality of objects to a graphical reference;
   receiving text typed into the command line;
   dragging and dropping the graphical reference into the command line with the text for inserting the one of the plurality of objects selected by the selection with the text in the command line to yield a modified command line input;

parsing the modified command line input to determine the one of the plurality of objects associated with the graphical reference;

distilling and normalizing the modified command line input; and executing, by a processor, the one of the plurality of objects inserted as an operation within the command line.

2. The method of claim 1, further comprising receiving a query to search the graphical hierarchical tree listing of the plurality of objects.

3. The method of claim 2, further comprising searching the graphical hierarchical tree listing of the plurality of objects.

4. The method of claim 3, further comprising comparing the query to the graphical hierarchical tree listing of the plurality of objects.

5. The method of claim 1, further comprising associating the one of the plurality of objects selected by the selection to a syntax extension.

6. The method of claim 5, further comprising receiving the syntax extension typed into the command line.

7. The method of claim 1, further comprising:
receiving the graphical hierarchical tree listing of the plurality of objects from a server; and
transmitting the command line to the server.

8. The method of claim 1, further comprising embedding the operation into the command line.

9. The method of claim 1, further comprising parsing the one of the plurality of objects selected by the selection.

10. The method of claim 1, further comprising sending a normalized command line to a server for execution.

11. The method of claim 1, further comprising embedding the one of the plurality of objects selected by the selection as an argument in the command line.

12. A system for executing a textual command line on a plurality of objects, the system comprising:
a processor; and
a memory storing instructions which when executed cause the processor to perform operations, the operations comprising:
receiving a hierarchical tree listing of a plurality of graphical objects, each object of the plurality of objects graphically representing a different command to a disk operating system;
graphically displaying a graphical user interface including the hierarchical tree listing of the plurality of graphical objects;
receiving, from a user an input, a selection of a graphical object in the hierarchical tree listing of the plurality of graphical objects;

associating the selection of the graphical object to a graphical reference;
receiving the textual command line typed into the graphical user interface;
dragging and dropping the graphical reference between text commands in the textual command line;
parsing the textual command line to determine the graphical object associated with the graphical reference;
distilling and normalizing the textual command line with the graphical reference inserted therein; and
executing the graphical reference as an operation within the textual command line.

13. The system of claim 12,
wherein the operations further comprise associating the graphical reference to a syntax extension.

14. The system of claim 13,
wherein the operations further comprise receiving the syntax extension typed into the textual command line.

15. The system of claim 13,
wherein the operations further comprise enclosing the graphical reference within a shell in the textual command line.

16. The system of claim 12,
wherein the operations further comprise embedding the graphical reference into the textual command line.

17. A memory storing instructions that, when executed, cause a processor to perform operations, the operations comprising:
displaying a graphical user interface including a graphical hierarchical tree listing of a plurality of objects, each object in the plurality of objects graphically representing a different operational command to an operating system;
receiving, from an input, a selection of an object in the graphical hierarchical tree listing of the plurality of objects;
associating the selection of the object to a graphical reference;
receiving a textual command line typed into the graphical user interface;
dragging and dropping the graphical reference between text commands in the textual command line;
parsing the textual command line to determine the object associated with the graphical reference;
distilling and normalizing the textual command line with the graphical reference inserted therein; and
executing the graphical reference as an operation within the textual command line.

18. The memory of claim 17, further comprising embedding the graphical reference into the textual command line.

* * * * *